US012639032B2

(12) United States Patent
Gupta

(10) Patent No.: US 12,639,032 B2
(45) Date of Patent: May 26, 2026

(54) AUTOMATICALLY ROUTING AUDIO DATA BASED ON SPEECH CODEC USAGE

(71) Applicant: Motorola Mobility LLC, Chicago, IL (US)

(72) Inventor: Ranjeet Gupta, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 316 days.

(21) Appl. No.: 18/592,956

(22) Filed: Mar. 1, 2024

(65) Prior Publication Data

US 2025/0278237 A1    Sep. 4, 2025

(51) Int. Cl.
*G06F 3/16* (2006.01)
*H04M 1/72469* (2021.01)

(52) U.S. Cl.
CPC ........ *G06F 3/165* (2013.01); *H04M 1/72469* (2021.01)

(58) Field of Classification Search
CPC ............................ G06F 3/165; H04M 1/72469
See application file for complete search history.

(56) References Cited

U.S. PATENT DOCUMENTS

2017/0102914 A1*    4/2017    Hong ...................... H04W 4/80
2020/0174741 A1*    6/2020    Xia ................... H04M 1/72442

OTHER PUBLICATIONS

Johnson, Dave , "How to change the audio output on an Android without disconnecting your headphones or speakers", retrieved from the internet on May 19, 2024, <https://www.businessinsider.com/guides/tech/how-to-change-audio-output-on-android>, Mar. 5, 2021, 8 pages.
Mar_tijn , "How can I disable auto routing calls to external bluetooth speaker?", retrieved from the internet on May 19, 2024, <https://discussions.apple.com/thread/253743859?sortBy=best>, Mar. 15, 2022, 2 pages.

* cited by examiner

*Primary Examiner* — Carolyn R Edwards
*Assistant Examiner* — Joseph Saunders, Jr.
(74) *Attorney, Agent, or Firm* — FIG. 1 Patents

(57) ABSTRACT

Audio data is received at an electronic device. This audio data can be received from various sources, such as a microphone of the electronic device, a modem or network connection, a local storage device, and so forth. The electronic device determines whether the received audio data was encoded using a speech codec and whether the electronic device is connected to an external public speaker. If the audio data was encoded using a speech codec, and the electronic device is connected to an external public speaker, then the audio data is automatically routed to a private speaker of the electronic device (e.g., an internal speaker of the electronic device) rather than the external public speaker.

20 Claims, 7 Drawing Sheets

100

Electronic Device  102

Display  104

Microphone  106

Speaker  108

Processing System  110

Operating System  112

Application  114

Communication System  116

Audio Manager  118

Storage Device
120

122

122

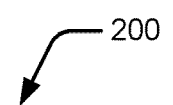
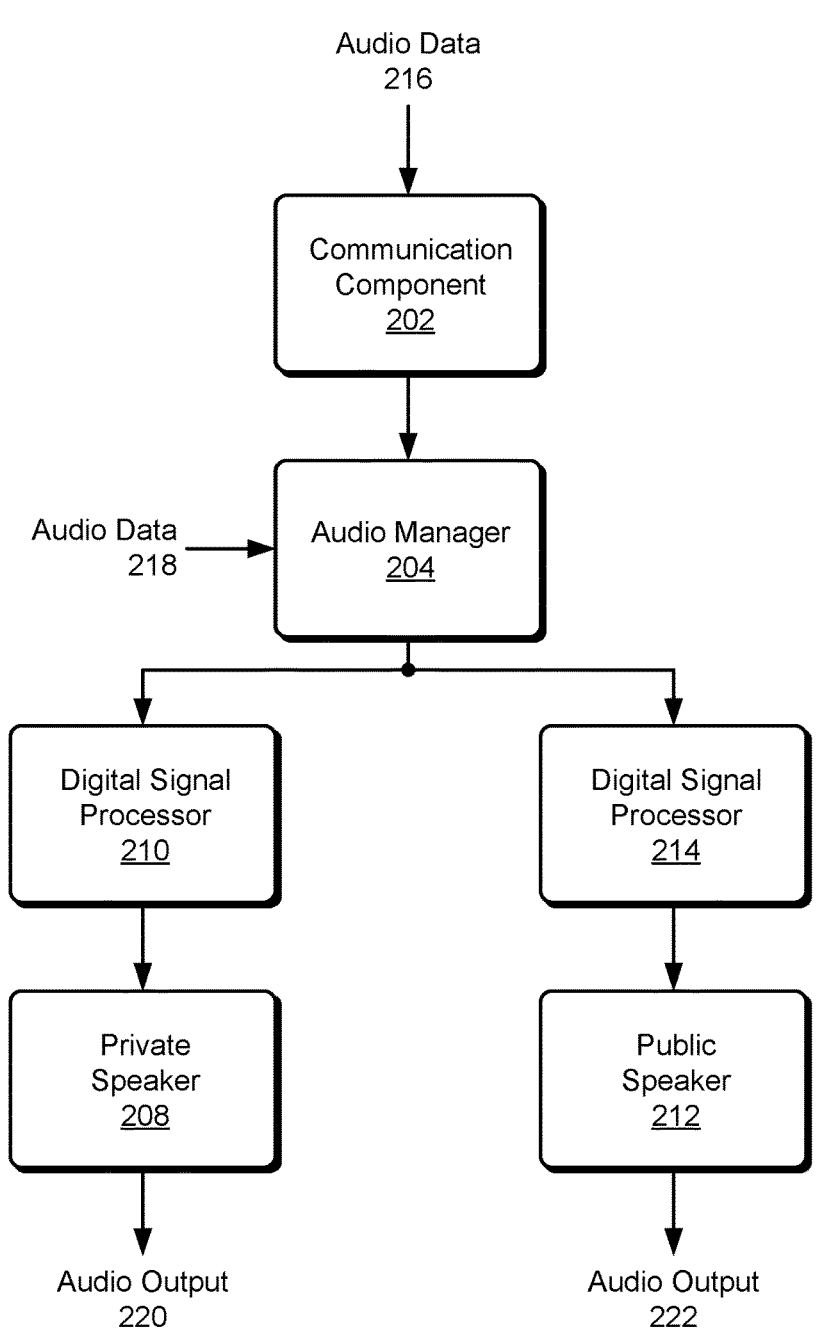
*FIG. 2*

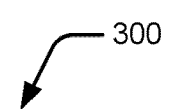
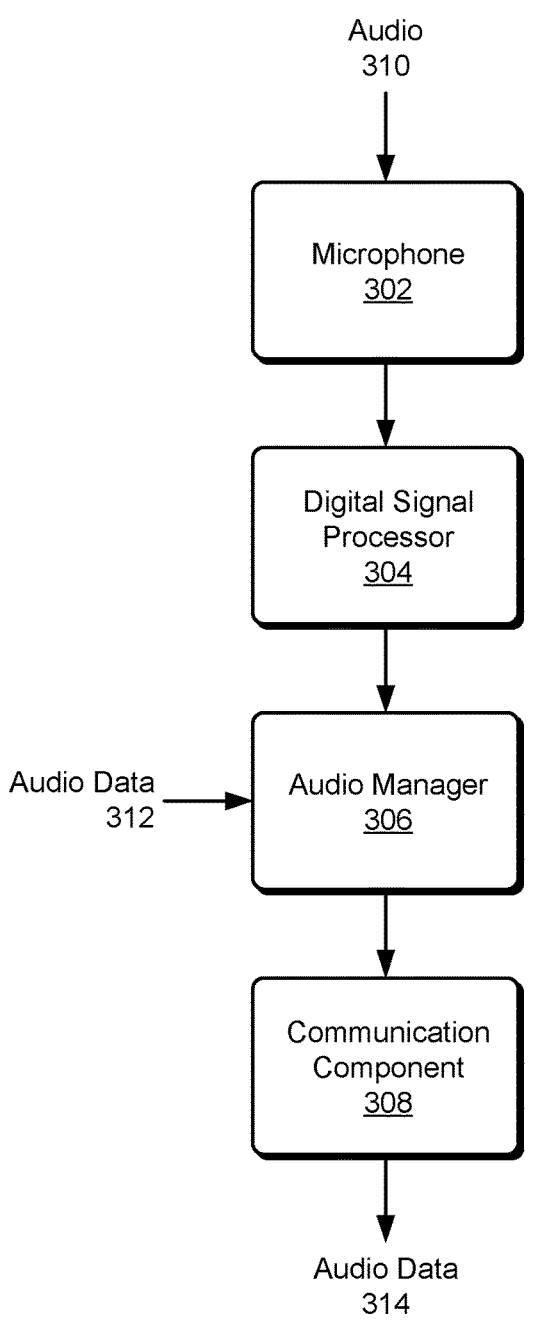
*FIG. 3*

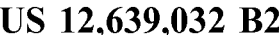

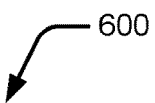

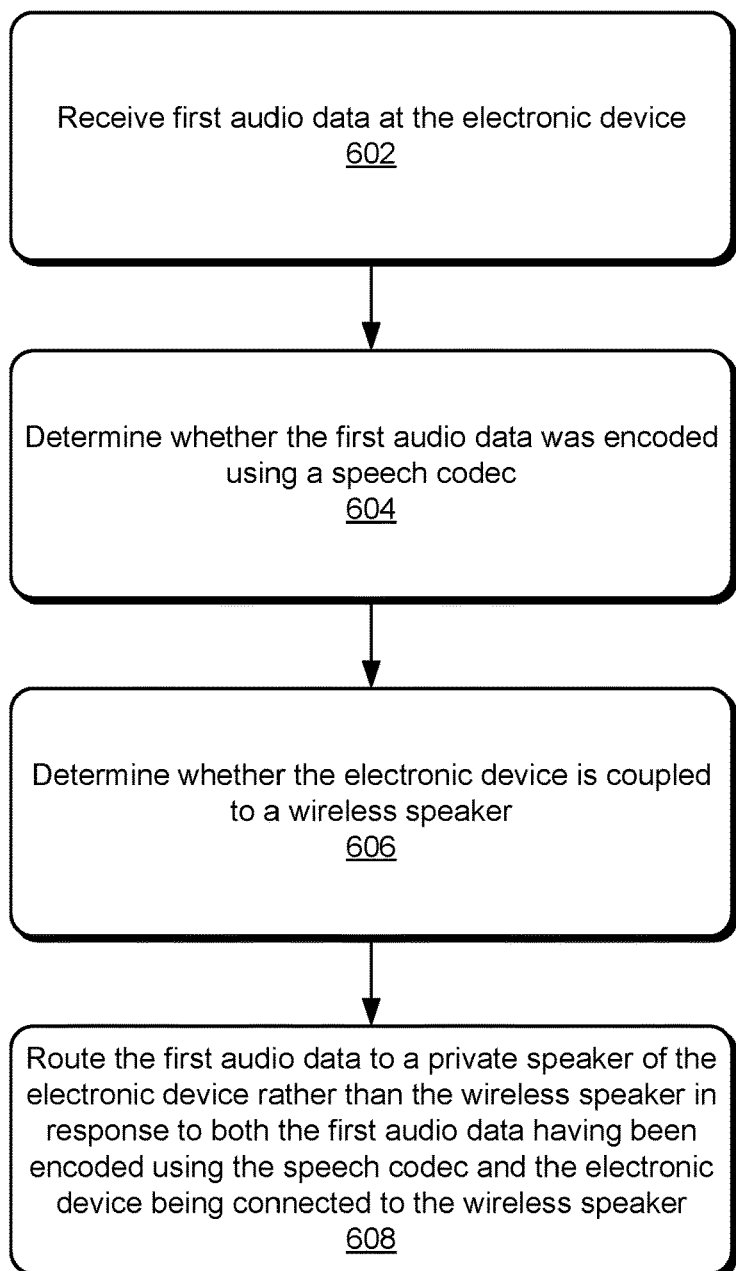

Receive first audio data at the electronic device
602

Determine whether the first audio data was encoded
using a speech codec
604

Determine whether the electronic device is coupled
to a wireless speaker
606

Route the first audio data to a private speaker of the
electronic device rather than the wireless speaker in
response to both the first audio data having been
encoded using the speech codec and the electronic
device being connected to the wireless speaker
608

*FIG. 6*

AUTOMATICALLY ROUTING AUDIO DATA BASED ON SPEECH CODEC USAGE

BACKGROUND

As technology has advanced our uses for computing devices have expanded. One such use is playback of audio data, such as music, people's voices from phone calls or video calls, and so forth. This audio can be played back using various speakers, such as an internal speaker of the computing device, an external wireless speaker in close proximity to the computing device, and so forth. This can pose problems for a user of the computing device as it can lead to situations where audio that the user wants data played back by one speaker is actually played back by a different speaker.

BRIEF DESCRIPTION OF THE DRAWINGS

Embodiments of automatically routing audio data based on speech codec usage are described with reference to the following drawings. The same numbers are used throughout the drawings to reference like features and components:

FIG. 2 illustrates an example architecture implementing the techniques discussed herein;

FIG. 3 illustrates another example architecture implementing the techniques discussed herein;

FIG. 6 illustrates an example process for implementing the techniques discussed herein in accordance with one or more embodiments;

DETAILED DESCRIPTION

Figure 1:
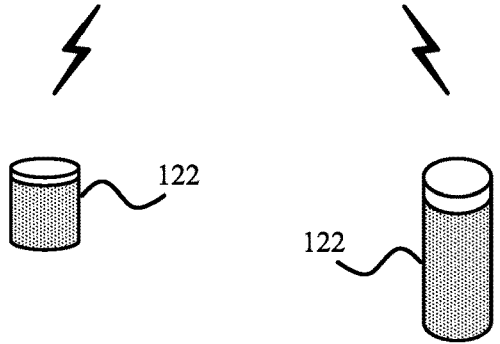
FIG. 1 illustrates an example system including an electronic device implementing the techniques discussed herein.

Automatically routing audio data based on speech codec usage is discussed herein. Generally, audio data is encoded using an encoder/decoder, also referred to as a codec. The codec encodes or decodes audio data, typically compressing (when encoding) and decompressing (when decoding) the audio data. Compressing audio data reduces the size of the audio data, thus reducing storage device usage when storing the audio data, reducing bandwidth when transmitting the audio data, and so forth. Different codecs are commonly used for different types of audio data. For example, one set of one or more codecs may be used to encode or decode music and another set of one or more codecs may be used to encode or decode speech.

An electronic device can include or be connected to (e.g., wirelessly connected to) various different speakers. These speakers include speakers that are intended or designed to play back audio privately to the user so that other people in the vicinity of the electronic device are not able to hear the audio. Such speakers are also referred to as private speakers or internal private speakers. Examples of such speakers include internal speakers (e.g., speakers internal part of or mounted to the electronic device allowing the user to hear audio when he places the electronic device next to his ear, such as when making a voice phone call) and wireless speakers (e.g., in headphones or earbuds). Other speakers are intended or designed to play back audio publicly so that the user of the electronic device as well as other people in the vicinity of the speaker are able to hear the audio. Such speakers are also referred to as public speakers or external public speakers. Examples of such speakers include external wireless portable speakers, speakers in automobiles, and so forth.

Using the techniques discussed herein, audio data is received at an electronic device. This audio data can be received from various sources, such as a microphone of the electronic device, a modem or network connection, a local storage device, and so forth. The electronic device determines whether the received audio data was decoded or encoded using a speech codec and whether the electronic device is connected to an external public speaker. If the audio data was decoded or encoded using a speech codec, and the electronic device is connected to an external public speaker, then the audio data is automatically routed to a private speaker of the electronic device (e.g., an internal speaker of the electronic device) rather than the external public speaker. However, if the audio data was decoded or encoded using a codec other than a speech codec, and the electronic device is connected to an external public speaker, then the audio data is automatically routed to the external public speaker rather than the private speaker of the electronic device.

In contrast to traditional techniques for routing audio data, the techniques discussed herein automatically route audio data based on whether a speech codec was used to decode or encode the audio data. This simplifies the user interface of the electronic device because the user need not access audio routing settings of the electronic device to specify which of multiple speakers the audio for calls (e.g., voice calls, which optionally include video) is to be routed. Rather, the audio data can be automatically routed to the appropriate speaker without needing user input.

Additionally, the techniques discussed herein enhance security of the electronic device, allowing the electronic device to automatically route audio data so that confidential information (e.g., audio of phone calls) is routed to a private speaker whereas non-confidential information (e.g., music) is routed to an external public speaker. Furthermore, the techniques discussed herein are applicable to any type of voice call that includes audio data, such as a phone call, an audio/video call, a conference call, a bridge call, a voice over Internet Protocol (VoIP) call, and so forth.

FIG. 1 illustrates an example system 100 including an electronic device 102 implementing the techniques discussed herein. The electronic device 102 can be, or include, many different types of computing or electronic devices. For example, the electronic device 102 can be a smartphone or other wireless phone, a notebook computer (e.g., netbook or ultrabook), a laptop computer, a wearable device (e.g., a smartwatch, a ring or other jewelry, augmented reality headsets or glasses, virtual reality headsets or glasses), a tablet or phablet computer, an entertainment device (e.g., a gaming console, a portable gaming device, a streaming media player, a digital video recorder, a music or other audio playback device), an automotive computer, and so forth.

The electronic device 102 includes a display 104, a microphone 106, and a speaker 108. The display 104 can be configured as any suitable type of display, such as an organic light-emitting diode (OLED) display, active matrix OLED display, liquid crystal display (LCD), in-plane shifting LCD, projector, and so forth. The microphone 106 can be configured as any suitable type of microphone incorporating a transducer that converts sound into an electrical signal, such as a dynamic microphone, a condenser microphone, a piezoelectric microphone, and so forth. The speaker 108 can be configured as any suitable type of speaker incorporating a transducer that converts an electrical signal into sound, such as a dynamic loudspeaker using a diaphragm, a piezoelectric speaker, non-diaphragm based speakers, and so forth. The speaker 108 may also be referred to as a private speaker or internal private speaker.

In one or more implementations, the display 104, the microphone 106, and the speaker 108 are internal to, mounted within, or physically part of the electronic device 102. Additionally or alternatively, one or more of the display 104, the microphone 106, and the speaker 108 can be implemented separately from the electronic device 102. In such situations, the electronic device 102 can communicate with the display 104, the microphone 106, or the speaker 108 via any of a variety of wired (e.g., Universal Serial Bus (USB), IEEE 1394, High-Definition Multimedia Interface (HDMI)) or wireless (e.g., WiFi™, Bluetooth™, infrared (IR)) connections. For example, the display 104 may be separate from the electronic device 102 and the electronic device 102 (e.g., a streaming media player) communicates with the display 104 via an HDMI cable. By way of another example, the microphone 106 may be separate from the electronic device 102 (e.g., the electronic device 102 may be a television and the microphone 106 may be implemented in a remote control device) and voice inputs received by the microphone 106 are communicated to the electronic device 102 via an IR or radio frequency wireless connection. By way of another example, the speaker 108 may be separate from the electronic device 102 and may be a wireless speaker (e.g., the electronic device 102 may be a cell phone and the speaker 108 may be implemented in a wireless headset or earbuds) and audio data for playback routed to the speaker 108 via a WiFi™ or Bluetooth™ connection.

The electronic device 102 also includes a processing system 110 that includes one or more processors, each of which can include one or more cores. The processing system 110 is coupled with, and may implement functionalities of, any other components or modules of the electronic device 102 that are described herein. In one or more embodiments, the processing system 110 includes a single processor having a single core. Alternatively, the processing system 110 includes a single processor having multiple cores or multiple processors (each having one or more cores).

The electronic device 102 also includes an operating system 112. The operating system 112 manages hardware, software, and firmware resources in the electronic device 102. The operating system 112 manages one or more applications 114 running on the electronic device 102 and operates as an interface between the one or more applications 114 and hardware components of the electronic device 102.

The electronic device 102 also includes a communication system 116. The communication system 116 manages communication with various other devices, including establishing voice calls with other devices, sending electronic communications to and receiving electronic communications from other devices, and so forth. The content of these electronic communications and the recipients of these electronic communications is managed by an application 114 or the operating system 112. This management of the content and recipients can include displaying received electronic communications, providing a user interface to compose a new electronic communication or reply to a received electronic communication, playing back audio data of an electronic communication, selecting recipients for an electronic communication, and so forth.

This communication can take various forms, such as voice calls (e.g., over a cellular system, public switched telephone network (PSTN), network (e.g., using VoIP, voice over local area network (VoLAN), voice over WiFi™ (VoWiFi)), short messaging service (SMS) messages, multimedia messaging service (MMS) messages, email, group based chat messaging system, and so forth. This communication can be carried out over a network, which can be any of a variety of different networks, including the Internet, a local area network (LAN), a public telephone network, a cellular network (e.g., a third generation (3G) network, a fourth generation (4G) network, a fifth generation (5G) network, or future generation network), an intranet, other public or proprietary networks, combinations thereof, and so forth. The electronic device 102 can thus communicate with other devices wirelessly and accordingly is also referred to as a wireless device.

The electronic device 102 also includes an audio manager 118. The audio manager 118 receives audio data at the electronic device 102. This audio data can be received from various sources, such as the microphone 106, the communication system 116 (e.g., a modem or network connection), a local storage device 120, and so forth. The audio manager 118 determines whether the received audio data was decoded or encoded using a speech codec and whether the electronic device 102 is connected to an external public speaker 122. If the audio data was decoded or encoded using a speech codec, and the electronic device 102 is connected to an external public speaker 122, then the audio data is automatically routed to the speaker 108 rather than the external public speaker 122. However, if the audio data was decoded or encoded using a codec other than a speech codec, and the electronic device 102 is connected to an external public speaker 122, then the audio data is automatically routed to the external public speaker 122 rather than speaker 108.

The external public speaker 122 is intended or designed to play back audio publicly so that the user of the electronic device 102 as well as other people in the vicinity of the electronic device 102 are able to hear the audio. Examples of such speakers include external wireless portable speakers, speakers in automobiles (e.g., speakers that are part of an automotive system), and so forth. The electronic device 102 can communicate with the external public speaker 122 via any of a variety of wired (e.g., USB, IEEE 1394, HDMI) or wireless (e.g., WiFi™, Bluetooth™, IR) connections.

The electronic device 102 can be connected to a wireless speaker, such as speaker 108 (e.g., if the speaker 108 is not part of the electronic device 102) or external public speaker 122. The electronic device 102 being connected to a wireless speaker refers to the electronic device 102 being able to transmit data to the wireless speaker for playback by the wireless speaker. Such a connection can take various forms, such as a WiFi™ connection, a Bluetooth™ connection, an IR connection, and so forth.

The audio manager 118 can be implemented in a variety of different manners. For example, the audio manager 118 can be implemented as multiple instructions stored on computer-readable storage media and that can be executed by the processing system 110. Additionally or alternatively, the audio manager 118 can be implemented at least in part in hardware (e.g., as an application-specific integrated circuit (ASIC), a field-programmable gate array (FPGA), an application-specific standard product (ASSP), a system-on-a-chip (SoC), a complex programmable logic device (CPLD), and so forth).

The storage device 120 can be implemented using any of a variety of storage technologies, such as magnetic disk, optical disc, Flash or other solid state memory, and so forth. The storage device 120 can store various program instructions and data for any one or more of the operating system 112, one or more applications 114, the audio manager 118, and so forth.

FIG. 2 illustrates an example architecture 200 implementing the techniques discussed herein. The architecture 200 includes a communication component 202, an audio manager 204, a private speaker 208 (e.g., a speaker 108 of FIG. 1) having an associated digital signal processor 210, and a public speaker 212 (e.g., a speaker 122 of FIG. 1) having an associated digital signal processor 214. In situations in which the speaker is separate from (e.g., external to) the electronic device 102 the digital signal processor is typically in the same physical enclosure as the speaker.

In the illustrated example, each of multiple speakers have an associated digital signal processor. It should be noted that in some situations, multiple speakers may be associated with the same digital signal processor.

The communication component 202 receives audio data 216, such as for a voice call. The communication component 202 can be, for example, a modem, a network interface card or chip, etc. The audio data 216 can be, for example, audio data for a cellular call or a VoIP call. In one or more implementations, the communication component 202 is part of the communication system 116 of FIG. 1. The communication component 202 can communicate with various additional electronic devices (not shown) via a network, such as a LAN, a cellular network, or any other network discussed above.

The communication component 202 transmits the audio data 216 to an audio manager 204. The communication component 202 connects with the audio manager via a framework that exposes, for example, one or more application programming interfaces (APIs) that can be called by the communication component 202 to pass the audio data 216 to the audio manager 204.

The audio manager 204 receives the audio data 216 from the communication component 202. The audio manager 204 can determine the codec used to encode or decode the audio data 216 in any of a variety of different manners. In one or more implementations, the codec used to encode or decode the audio data 216 is identified in metadata associated with the audio data 216. For example, the audio data 216 may be received as a group of packets or blocks of audio data may. Each of these packets or blocks of data can have associated meta data (e.g., one or more headers) that indicate the codec used to encode or decode the audio data 216. Additionally or alternatively, at a beginning of a voice call, the codec used to encode or decode the audio data 216 may be indicated by the electronic device 102 or another electronic device communicating with the electronic device 102. An indication of this codec is provided (e.g., by the communication component 202, one or more applications 114 of FIG. 1., the operating system 112 of FIG. 1, etc.) to the audio manager 204.

Additionally or alternatively, the audio manager 204 receives audio data 218 from a source other than the communication component 202. For example, the audio data 218 may be received from a local storage device (e.g., local storage device 120 of FIG. 1), and may be, e.g., songs or other music data stored in a user's music folder. The audio manager 204 can determine the codec used to encode or decode the audio data 218, analogous to the discussion above regarding the audio manager 204 determining the codec used to encode or decode the audio data 216.

Accordingly, the audio manager 204 can readily determine the codec used to encode or decode audio data. Different codecs are used for different purposes, such as to prioritize speech quality, to prioritize music quality, to prioritize compression over sound quality, to priority sound quality over compression, and so forth. Generally, speech codecs are used to prioritize speech quality, which is useful in voice calls, rather than music playback. Examples of speech codecs include G.711, G.722, and G.729. Examples of codecs other than speech codecs include Moving Picture Experts Group (MPEG)-1 Audio Layer 3 (MP3) and Advanced Audio Coding (AAC).

The audio manager 204 determines which of speakers 208 and 212 to route the audio data to depending on the codec used to encode or decode the audio data. In one or more implementations, the audio manager 204 determines whether the received audio data was decoded or encoded using a speech codec and whether the electronic device 102 is connected to the public speaker 212. If the audio data was decoded or encoded using a speech codec (e.g., audio data 216 that is audio data for a cellular call or a VoIP call), and the electronic device 102 is connected to the public speaker 212, then the audio manager 204 is automatically routed to the private speaker 208 rather than the public speaker 212. However, if the audio data (e.g., audio data 218 received from a local music folder) was decoded or encoded using a codec other than a speech codec, and the electronic device 102 is connected to the public speaker 212, then the audio data is automatically routed to the public speaker 212 rather than the private speaker 208.

In one or more implementations, the audio manager 204 routes the data to one of the speakers 208 and 212 via a hardware abstraction layer and kernel driver. The kernel driver is a driver of the operating system 112 of FIG. 1 that is associated with the digital signal processor 210 if the audio data is being routed to the private speaker 208, or that is associated with the associated digital signal processor 214 if the audio data is being grouted to the public speaker 212.

It should be noted that audio data 216 received by the communication component 202 can be audio data other than audio data for a voice call. For example, the audio data 216 may be received from a music streaming service and thus encoded using an codec other than a speech codec. In such situations, the audio manager 204 routes the audio data 216 to the public speaker 212 rather than the speaker 208.

For the speaker that the audio data is routed to, the audio manager 204 provides the audio data to the digital signal processor associated with that speaker. Accordingly, for audio data to be routed to the private speaker 208, the audio manager 204 provides the audio data to the associated digital signal processor 210, and for audio data to be routed to the public speaker 212, the audio manager 204 provides the audio data to the associated digital signal processor 214.

The digital signal processor 210 performs any of various processing on the audio data it receives, such as decoding encoded audio data, and provides the audio data to the private speaker 208, which plays back the audio data as audio output 220. The digital signal processor 214 performs any of various processing on the audio data it receives, such as decoding encoded audio data, and provides the audio data to the public speaker 212, which plays back the audio data as audio output 222.

It should be noted that the techniques discussed herein allow two different sets of audio data to be routed to two different speakers. For example, assume that a user of the electronic device 102 is playing back music (e.g., audio data 218) on public speaker 212 when an incoming phone call is received, and the user answers the phone call. The audio manager 204 continues to route audio data 218 to the public speaker 212 concurrently with routing voice data from the phone call (e.g., audio data 216) to the private speaker 208.

FIG. 3 illustrates an example architecture 300 implementing the techniques discussed herein. The architecture 300 includes a microphone 302, a digital signal processor 304, an audio manager 306, and a communication component 308. The communication component 308 can be, for example, a modem, a network interface card or chip, etc. The architecture 300 is similar to the architecture 200 of FIG. 2, except that the architecture 300 is transmitting audio data rather than receiving audio data.

The microphone 302 receives audio 310. The audio 310 can be the voice of a user (e.g., of the electronic device 102 that includes the architecture 300) for a voice call. The audio 310 can be, for example, audio data for a cellular call or a VoIP call.

The microphone 302 provides the audio to the digital signal processor 304. The digital signal processor 304 performs any of various processing on the audio 310 it receives, such as encoding the audio, to generate audio data and provides the audio data to the audio manager 306. The digital signal processor 304 connects with the audio manager 306 via a framework that exposes, for example, one or more APIs that can be called by the digital signal processor 304 to pass the audio data to the audio manager 306.

In one or more implementations, digital signal processor 304 is preconfigured with a particular codec to use for the audio received from the microphone 302. For example, it may be assumed that the microphone 302 is receiving audio that is the voice of a user, so the digital signal processor 304 is preconfigured to use a speech codec. Additionally or alternatively, the audio manager 306 provides an indication to the digital signal processor 304 of the codec to use to encode audio received from the microphone 302.

The audio manager 306 receives the audio data from the digital signal processor 304. Additionally or alternatively, the audio manager 306 receives audio data 312 from a source other than the digital signal processor 304. For example, the audio data 312 may be received from a local storage device (e.g., local storage device 120 of FIG. 1), and may be, e.g., songs or other music data stored in a user's music folder.

The communication component 308 receives the audio data, whether audio data 312 or audio data from the digital signal processor 304. In one or more implementations, the communication component 308 is part of the communication system 116 of FIG. 1. The communication component 308 transmits the audio data as audio data 314 to any of various additional electronic devices (not shown) via a network, such as a LAN, a cellular network, or any other network discussed above.

Figure 4:
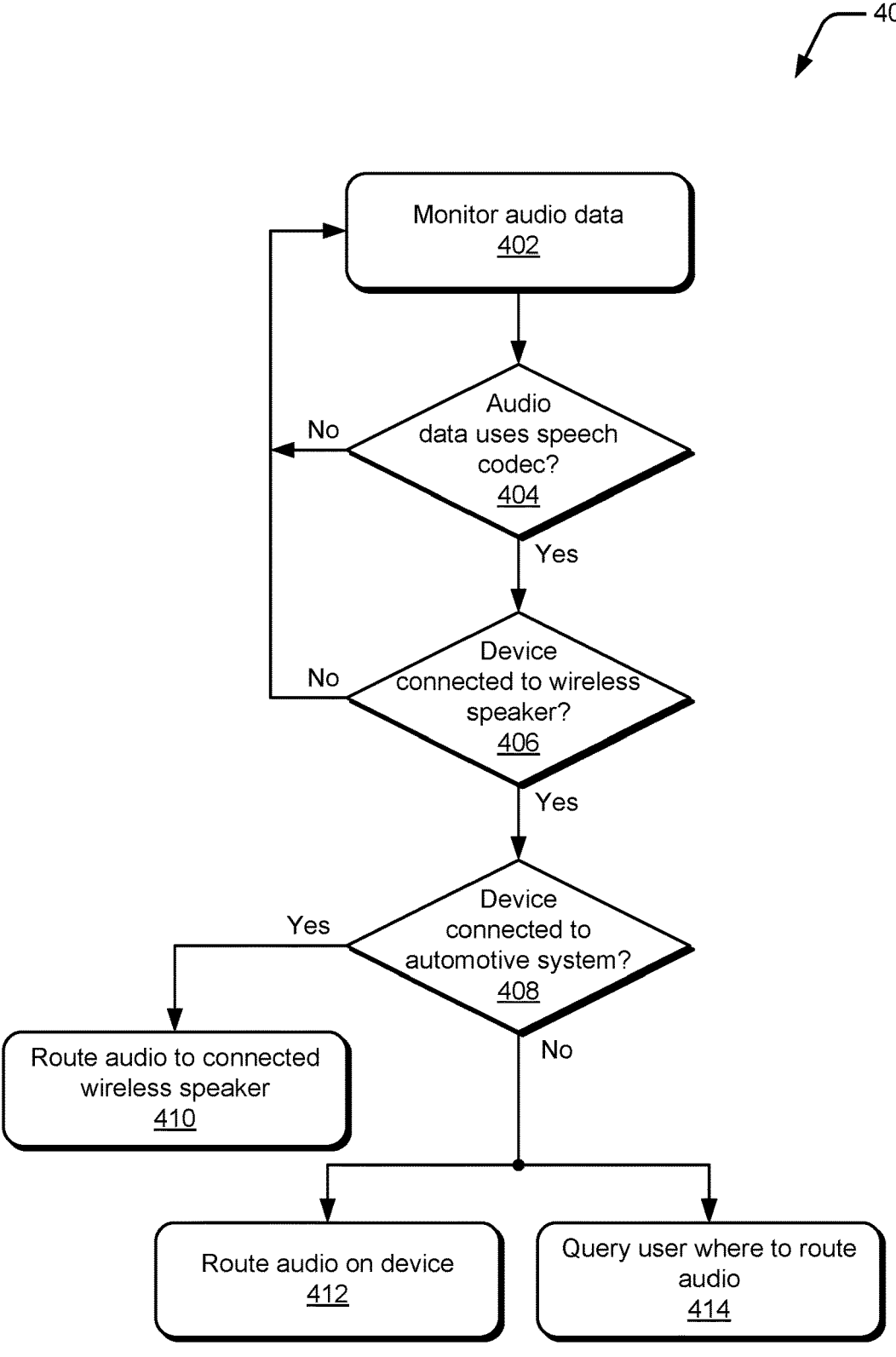
FIG. 4 illustrates an example of routing audio data in accordance with the techniques discussed herein.

FIG. 4 illustrates an example of routing audio data in accordance with the techniques discussed herein. The routing of audio data illustrated in the example 400 of FIG. 4 can be performed by an audio manager, such as audio manager 118 of FIG. 1, audio manager 204 of FIG. 2, or audio manager 306 of FIG. 3.

In the example 400, at 402 audio data is monitored. This monitoring is performed, for example, to determine one or more speakers to route audio data to.

At 404, a determination is made as to whether the audio data uses a speech codec. If the audio data does not use a speech codec, the audio data continues to be monitored at 402.

At 406, a determination is made as to whether the electronic device implementing the routing in the example 400 (e.g., an electronic device of FIG. 1) is connected to a wireless speaker. This wireless speaker is, for example, an external public speaker 122 of FIG. 1. If the electronic device is not connected to a wireless speaker then the audio data continues to be monitored at 402.

However, if the electronic device is connected to a wireless speaker, at 408 a determination is made whether the electronic device implementing the routing in the example 400 is connected to an automotive system. An automotive system refers to an audio playback system in a vehicle, e.g., a car stereo system. The electronic device can be wireless connected to the automotive system, such as by using Android Auto functionality or Apple CarPlay functionality.

If the electronic device is connected to an automotive system, then at 410 audio data is routed to the connected wireless speaker. In this situation, the connected wireless speaker is the speaker of the audio system. The audio data is routed to the connected wireless speaker for safety reasons, e.g., so a user does not attempt to pick up his phone for a voice call while driving.

If the electronic device is not connected to an automotive system, then in one or more implementations, at 412 the audio data is automatically routed to a private speaker (e.g., a speaker 108 of FIG. 1). Additionally or alternatively, at 414 the user queried (e.g., prompted) as to indicate to which of a private speaker or a public speaker (e.g., the wireless speaker the electronic device is connected to) the user desires the audio data to be routed.

Figure 5:
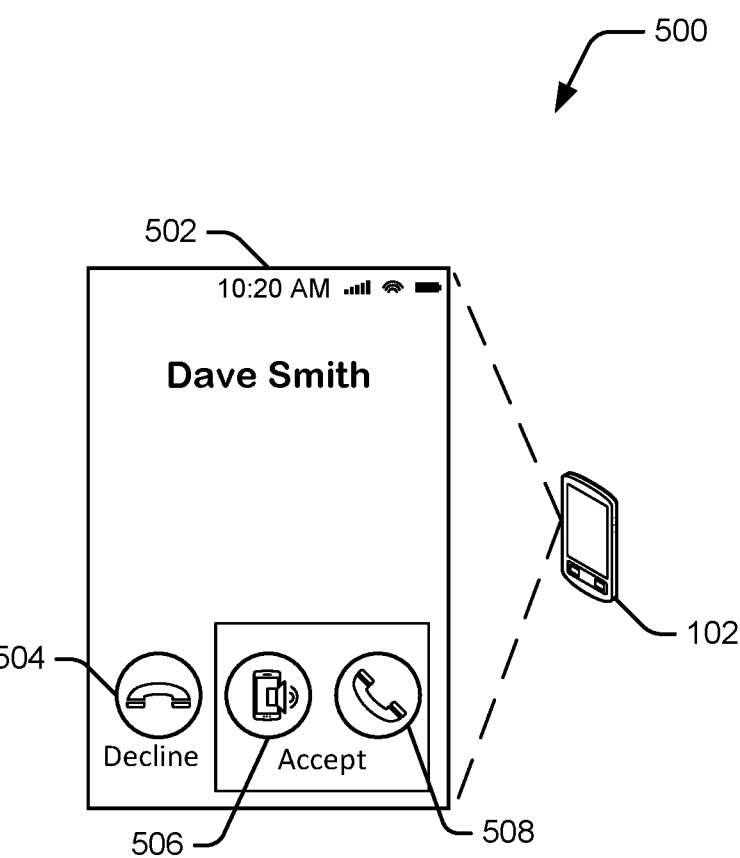
FIG. 5 illustrates an example of querying a user to indicate which speaker to route data to in accordance with the techniques discussed herein.

FIG. 5 illustrates an example 500 of querying a user to indicate which speaker to route data to in accordance with the techniques discussed herein. The example 500 illustrates an electronic device 102 displaying a user interface 502. The user interface 502 displays an indication that a user named "Dave Smith" is calling.

The user interface also displays multiple user selectable icons or buttons, including button 504, button 506, and button 508. The button 504 corresponds to declining the call. User selection of (e.g., pressing on) the button 504 causes the electronic device 102 to not establish a voice call with the caller.

The buttons 506 and 508 correspond to accepting the call. The button 506 corresponds to routing audio data to a wireless speaker connected to the electronic device (e.g., a public speaker). User selection of (e.g., pressing on) the button 506 causes the electronic device 102 to establish a voice call with the caller and route the audio data received from the calling device to the public speaker. The button 506 corresponds to routing audio data to a private speaker (e.g., an internal speaker of the electronic device). User selection of (e.g., pressing on) the button 508 causes the electronic device 102 to establish a voice call with the caller and route the audio data received from the calling device to the private speaker.

Accordingly, using the techniques discussed herein, audio data, regardless of the source, can be monitored to determine whether a codec used to encode or decode the audio data is a speech codec and a determination made as to which of multiple speakers to route the audio data to. The determination is made based on the codec used to encode or decode the data rather than based on the source of the data (e.g., a modem).

Furthermore, the techniques discussed herein support dynamic call preferences, where the user can select, on a call-by-call basis, which speaker to route the audio for a voice call to.

Additionally, the techniques discussed herein work on various different types of voice calls. These voice calls may be, for example, calls routed through an Internet service provider (ISP), VoLAN calls, VoIP calls, and so forth.

Furthermore, the techniques discussed herein apply to calls originated from another device as well as outgoing calls. For example, if the electronic device 102 initiates a voice call with another electronic device, audio data received by the electronic device 102 as part of that voice call can be automatically routed to a private speaker.

Additionally, the techniques discussed herein simplify connecting an electronic device to multiple wireless speakers. The audio data for a voice call can be automatically routed to a private speaker without having to configure each of multiple public speakers to not receive the audio data.

Furthermore, the techniques discussed herein allow for dual audio playback. For example, incoming voice call audio is played back on a private speaker while ongoing music audio is relayed or played back on a wireless public speaker without interruption of the incoming voice call.

Additionally, in one or more implementations the audio manager 118 routes a call indication (e.g., a beep sound) to the wireless public speaker in response to an incoming voice call. The call indication is output by the wireless public speaker concurrently with outputting other audio (e.g., music). This allows, for example, an indication of an incoming call to be output by the wireless public speaker while continuing to output music, avoiding stopping playback of the music in order to announce the existence of the incoming call.

FIG. 6 illustrates an example process 600 for implementing the techniques discussed herein in accordance with one or more embodiments. Process 600 is carried out by an audio manager of an electronic device, such as audio manager 118 of FIG. 1, and can be implemented in software, firmware, hardware, or combinations thereof. Process 600 is shown as a set of acts and is not limited to the order shown for performing the operations of the various acts.

In process 600, first audio data is received at the electronic device (act 602). The first audio data can be received from various sources, such as another electronic device, a server, a local data store, and so forth.

A determination is made as to whether the first audio data was encoded using a speech codec (act 604). This determination can be made in various manners, such as based on metadata associated with the first audio data.

A determination is made as to whether the electronic device is coupled to a wireless speaker (606). The wireless speaker is a public speaker or external public speaker, intended or designed to play back audio publicly so that the user of the electronic device as well as other people in the vicinity of the speaker are able to hear the audio.

The first audio data is routed to a private speaker of the electronic device rather than the wireless speaker in response to both the first audio data having been encoded using the speech codec and the electronic device being connected to the wireless speaker (act 608). The private speaker is an internal speaker of the electronic device that is intended or designed to play back audio privately to the user so that other people in the vicinity of the electronic device are not able to hear the audio.

Figure 7:
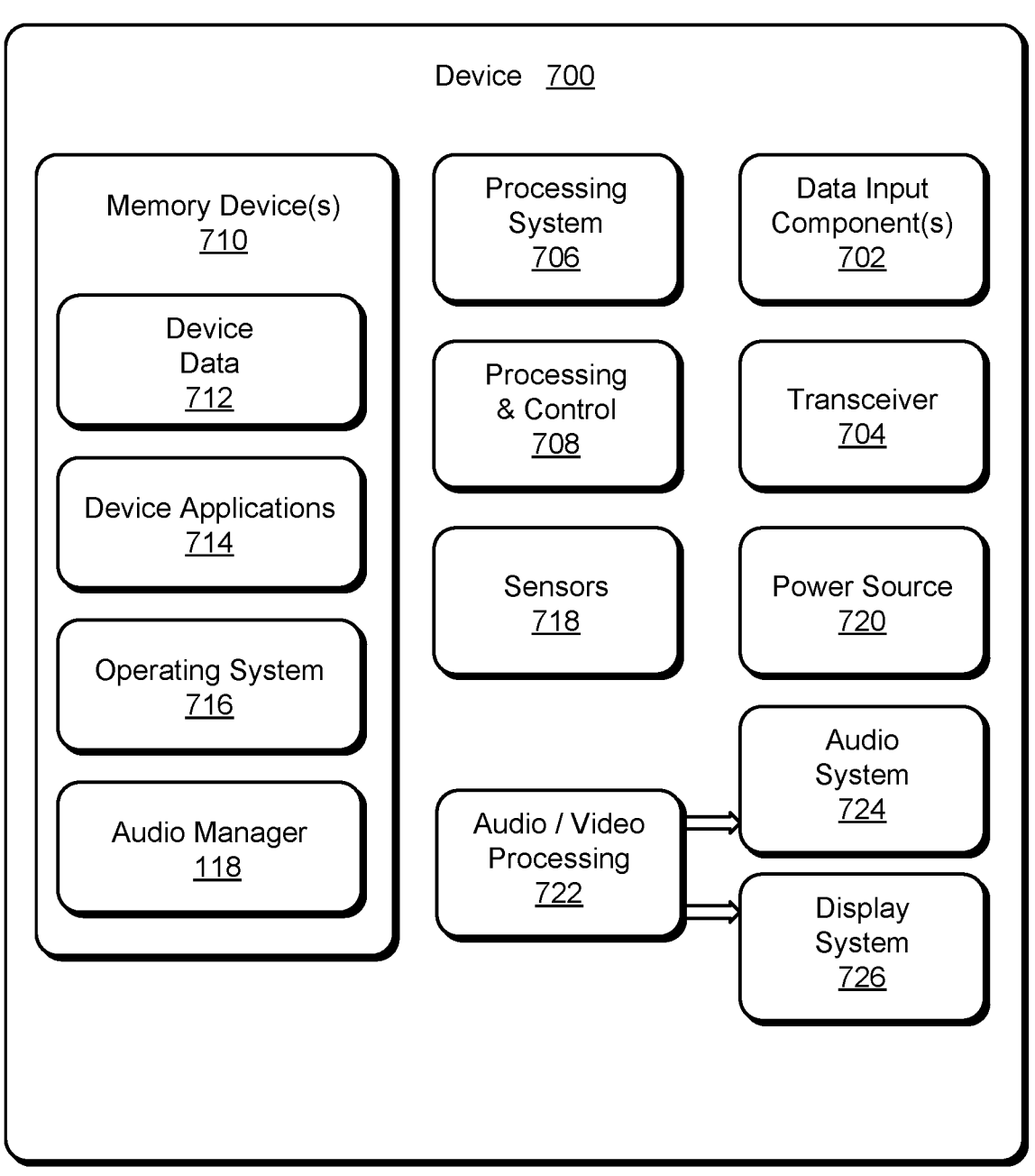
FIG. 7 illustrates various components of an example electronic device that can implement embodiments of the techniques discussed herein.

FIG. 7 illustrates various components of an example electronic device that can implement embodiments of the techniques discussed herein. The electronic device 700 can be implemented as any of the devices described with reference to the previous Figures, such as any type of client device, mobile phone, tablet, computing, communication, entertainment, gaming, media playback, or other type of electronic device. In one or more embodiments the electronic device 700 includes the audio manager 118, described above.

The electronic device 700 includes one or more data input components 702 via which any type of data, media content, or inputs can be received such as user-selectable inputs, messages, music, television content, recorded video content, and any other type of text, audio, video, or image data received from any content or data source. The data input components 702 may include various data input ports such as universal serial bus ports, coaxial cable ports, and other serial or parallel connectors (including internal connectors) for flash memory, DVDs, compact discs, and the like. These data input ports may be used to couple the electronic device to components, peripherals, or accessories such as keyboards, microphones, or cameras. The data input components 702 may also include various other input components such as microphones, touch sensors, touchscreens, keyboards, and so forth.

The device 700 includes communication transceivers 704 that enable one or both of wired and wireless communication of device data with other devices. The device data can include any type of text, audio, video, image data, or combinations thereof. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, wired local area network (LAN) Ethernet transceivers for network data communication, and cellular networks (e.g., third generation networks, fourth generation networks such as LTE networks, or fifth generation networks).

The device 700 includes a processing system 706 of one or more processors (e.g., any of microprocessors, controllers, and the like) or a processor and memory system implemented as a system-on-chip (SoC) that processes computer-executable instructions. The processing system 706 may be implemented at least partially in hardware, which can include components of an integrated circuit or on-chip system, an application-specific integrated circuit (ASIC), a field-programmable gate array (FPGA), a complex programmable logic device (CPLD), and other implementations in silicon or other hardware.

Alternately or in addition, the device can be implemented with any one or combination of software, hardware, firmware, or fixed logic circuitry that is implemented in connection with processing and control circuits, which are generally identified at 708. The device 700 may further include any type of a system bus or other data and command transfer system that couples the various components within the device. A system bus can include any one or combination of different bus structures and architectures, as well as control and data lines.

The device 700 also includes computer-readable storage memory devices 710 that enable one or both of data and instruction storage thereon, such as data storage devices that can be accessed by a computing device, and that provide persistent storage of data and executable instructions (e.g., software applications, programs, functions, and the like).

Examples of the computer-readable storage memory devices 710 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory device 710 provides data storage mechanisms to store the device data 712, other types of information or data, and various device applications 714 (e.g., software applications). For example, an operating system 716 can be maintained as software instructions with a memory device and executed by the processing system 706 to cause the processing system 706 to perform various acts. The device applications 714 may also include a device manager, such as any form of a control application, software application, signal-processing and control module, code that is native to a particular device, a hardware abstraction layer for a particular device, and so on.

The device 700 can also include one or more device sensors 718, such as any one or more of an ambient light sensor, a proximity sensor, a touch sensor, an infrared (IR) sensor, accelerometer, gyroscope, thermal sensor, audio sensor (e.g., microphone), and the like. The device 700 can also include one or more power sources 720, such as when the device 700 is implemented as a mobile device. The power sources 720 may include a charging or power system, and can be implemented as a flexible strip battery, a rechargeable battery, a charged super-capacitor, or any other type of active or passive power source.

The device 700 additionally includes an audio or video processing system 722 that generates one or both of audio data for an audio system 724 and display data for a display system 726. In accordance with some embodiments, the audio/video processing system 722 is configured to receive call audio data from the transceiver 704 and communicate the call audio data to the audio system 724 for playback at the device 700. The audio system or the display system may include any devices that process, display, or otherwise render audio, video, display, or image data. Display data and audio signals can be communicated to an audio component or to a display component, respectively, via an RF (radio frequency) link, S-video link, HDMI (high-definition multimedia interface), composite video link, component video link, DVI (digital video interface), analog audio connection, or other similar communication link. In implementations, the audio system or the display system are integrated components of the example device. Alternatively, the audio system or the display system are external, peripheral components to the example device.

Although embodiments of techniques for automatically routing audio data based on speech codec usage have been described in language specific to features or methods, the subject of the appended claims is not necessarily limited to the specific features or methods described. Rather, the specific features and methods are disclosed as example implementations of techniques for implementing automatically routing audio data based on speech codec usage. Further, various different embodiments are described, and it is to be appreciated that each described embodiment can be implemented independently or in connection with one or more other described embodiments. Additional aspects of the techniques, features, and/or methods discussed herein relate to one or more of the following:

In some aspects, the techniques described herein relate to an electronic device including: at least one memory; and at least one processor coupled with the at least one memory and configured to cause the electronic device to: receive first audio data at the electronic device; determine whether the first audio data was encoded using a speech codec; determine whether the electronic device is coupled to a wireless speaker; and route the first audio data to a private speaker of the electronic device rather than the wireless speaker in response to both the first audio data having been encoded using the speech codec and the electronic device being connected to the wireless speaker.

In some aspects, the techniques described herein relate to an electronic device, wherein to route the first audio data is to automatically route the first audio data to the private speaker.

In some aspects, the techniques described herein relate to an electronic device, wherein the at least one processor is further configured to cause the electronic device to: display a prompt for user input to select to route the first audio data to the private speaker or to the wireless speaker; wherein to route the first audio data is to route the first audio data to the private speaker in response to a user input selecting to route the first audio data to the private speaker.

In some aspects, the techniques described herein relate to an electronic device, wherein the private speaker of the electronic device includes at least one of an internal speaker of the electronic device, wireless headphones connected to the electronic device, or wireless earbuds connected to the electronic device.

In some aspects, the techniques described herein relate to an electronic device, wherein the at least one processor is further configured to cause the electronic device to automatically route the first audio data to the wireless speaker connected to the electronic device rather than the private speaker of the electronic device in response to both the electronic device being connected to the wireless speaker and the first audio data having been encoded using a codec other than a speech codec.

In some aspects, the techniques described herein relate to an electronic device, wherein the first audio data is received as part of a voice call initiated by an additional electronic device.

In some aspects, the techniques described herein relate to an electronic device, wherein the voice call includes a voice over Internet Protocol (VoIP) call.

In some aspects, the techniques described herein relate to an electronic device, wherein the first audio data is part of a voice call initiated by the electronic device.

In some aspects, the techniques described herein relate to an electronic device, wherein the voice call includes a voice over Internet Protocol (VoIP) call.

In some aspects, the techniques described herein relate to an electronic device, wherein the at least one processor is further configured to cause the electronic device to: receive second audio data at the electronic device; determine whether the second audio data was encoded using the speech codec; and automatically route, concurrently with routing the first audio data to the private speaker of the electronic device, the second audio data to the wireless speaker connected to the electronic device rather than the private speaker of the electronic device in response to both the electronic device being connected to the wireless speaker and the second audio data having been encoded using a codec other than a speech codec.

In some aspects, the techniques described herein relate to an electronic device, wherein the at least one processor is further configured to cause the electronic device to: determine whether the wireless speaker is a speaker of an automotive system; and route the first audio data to the wireless speaker connected to the electronic device rather than the private speaker of the electronic device in response to the electronic device being connected to the wireless speaker, the first audio data having been encoded using a codec other than a speech codec, and the wireless speaker being the speaker of the automotive system.

In some aspects, the techniques described herein relate to a method implemented at an electronic device, the method including: receiving first audio data at the electronic device; determining whether the first audio data was encoded using a speech codec; determining whether the electronic device is coupled to a wireless speaker; and routing the first audio data to a private speaker of the electronic device rather than the wireless speaker in response to both the first audio data having been encoded using the speech codec and the electronic device being coupled to the wireless speaker.

In some aspects, the techniques described herein relate to a method, wherein the routing includes automatically routing the first audio data to the private speaker.

In some aspects, the techniques described herein relate to a method, wherein the first audio data is received as part of a voice over Internet Protocol (VoIP) call initiated by an additional electronic device.

In some aspects, the techniques described herein relate to a method, wherein the first audio data is part of a voice over Internet Protocol (VoIP) call initiated by the electronic device.

In some aspects, the techniques described herein relate to a method, further including: receiving second audio data at the electronic device; determining whether the second audio data was encoded using the speech codec; and automatically routing, concurrently with routing the first audio data to the private speaker of the electronic device, the second audio data to the wireless speaker connected to the electronic device rather than the private speaker of the electronic device in response to both the electronic device being connected to the wireless speaker and the second audio data having been encoded using a codec other than a speech codec.

In some aspects, the techniques described herein relate to a method, further including: determining whether the wireless speaker is a speaker of an automotive system; and routing the first audio data to the wireless speaker connected to the electronic device rather than the private speaker of the electronic device in response to the electronic device being connected to the wireless speaker, the first audio data having been encoded using a codec other than a speech codec, and the wireless speaker being the speaker of the automotive system.

In some aspects, the techniques described herein relate to at least one processor configured to receive first audio data, determine whether the first audio data was encoded using a speech codec, determine whether the at least one processor is coupled to a wireless speaker, and route the first audio data to a private speaker rather than the wireless speaker in response to both the first audio data having been encoded using the speech codec and the at least one processor being connected to the wireless speaker.

In some aspects, the techniques described herein relate to an at least one processor, wherein to route the first audio data is to automatically route the first audio data to the private speaker.

In some aspects, the techniques described herein relate to an at least one processor, wherein the at least one processor is further configured to automatically route the first audio data to the wireless speaker connected to the at least one processor rather than the private speaker in response to both the at least one processor being connected to the wireless speaker and the first audio data having been encoded using a codec other than a speech codec.

What is claimed is:

1. An electronic device comprising:
   at least one memory; and
   at least one processor coupled with the at least one memory and configured to cause the electronic device to:
      receive first audio data at the electronic device;
      determine whether the first audio data was encoded using a speech codec;
      determine whether the electronic device is coupled to a wireless speaker; and
      route the first audio data to a private speaker of the electronic device rather than the wireless speaker in response to both the first audio data having been encoded using the speech codec and the electronic device being connected to the wireless speaker.

2. The electronic device of claim 1, wherein to route the first audio data is to automatically route the first audio data to the private speaker.

3. The electronic device of claim 1, wherein the at least one processor is further configured to cause the electronic device to:
   display a prompt for user input to select to route the first audio data to the private speaker or to the wireless speaker;
   wherein to route the first audio data is to route the first audio data to the private speaker in response to a user input selecting to route the first audio data to the private speaker.

4. The electronic device of claim 1, wherein the private speaker of the electronic device comprises at least one of an internal speaker of the electronic device, wireless headphones connected to the electronic device, or wireless earbuds connected to the electronic device.

5. The electronic device of claim 1, wherein the at least one processor is further configured to cause the electronic device to automatically route the first audio data to the wireless speaker connected to the electronic device rather than the private speaker of the electronic device in response to both the electronic device being connected to the wireless speaker and the first audio data having been encoded using a codec other than a speech codec.

6. The electronic device of claim 1, wherein the first audio data is received as part of a voice call initiated by an additional electronic device.

7. The electronic device of claim 6, wherein the voice call comprises a voice over Internet Protocol (VoIP) call.

8. The electronic device of claim 1, wherein the first audio data is part of a voice call initiated by the electronic device.

9. The electronic device of claim 8, wherein the voice call comprises a voice over Internet Protocol (VoIP) call.

10. The electronic device of claim 1, wherein the at least one processor is further configured to cause the electronic device to:
   receive second audio data at the electronic device;
   determine whether the second audio data was encoded using the speech codec; and
   automatically route, concurrently with routing the first audio data to the private speaker of the electronic device, the second audio data to the wireless speaker connected to the electronic device rather than the private speaker of the electronic device in response to both the electronic device being connected to the wireless speaker and the second audio data having been encoded using a codec other than a speech codec.

11. The electronic device of claim 1, wherein the at least one processor is further configured to cause the electronic device to:

determine whether the wireless speaker is a speaker of an automotive system; and route the first audio data to the wireless speaker connected to the electronic device rather than the private speaker of the electronic device in response to the electronic device being connected to the wireless speaker, the first audio data having been encoded using a codec other than a speech codec, and the wireless speaker being the speaker of the automotive system.

12. A method implemented at an electronic device, the method comprising:

receiving first audio data at the electronic device;

determining whether the first audio data was encoded using a speech codec;

determining whether the electronic device is coupled to a wireless speaker; and routing the first audio data to a private speaker of the electronic device rather than the wireless speaker in response to both the first audio data having been encoded using the speech codec and the electronic device being coupled to the wireless speaker.

13. The method of claim 12, wherein the routing comprises automatically routing the first audio data to the private speaker.

14. The method of claim 12, wherein the first audio data is received as part of a voice over Internet Protocol (VoIP) call initiated by an additional electronic device.

15. The method of claim 12, wherein the first audio data is part of a voice over Internet Protocol (VoIP) call initiated by the electronic device.

16. The method of claim 12, further comprising:

receiving second audio data at the electronic device;

determining whether the second audio data was encoded using the speech codec; and automatically routing, concurrently with routing the first audio data to the private speaker of the electronic device, the second audio data to the wireless speaker connected to the electronic device rather than the private speaker of the electronic device in response to both the electronic device being connected to the wireless speaker and the second audio data having been encoded using a codec other than a speech codec.

17. The method of claim 12, further comprising:

determining whether the wireless speaker is a speaker of an automotive system; and routing the first audio data to the wireless speaker connected to the electronic device rather than the private speaker of the electronic device in response to the electronic device being connected to the wireless speaker, the first audio data having been encoded using a codec other than a speech codec, and the wireless speaker being the speaker of the automotive system.

18. At least one processor configured to receive first audio data, determine whether the first audio data was encoded using a speech codec, determine whether the at least one processor is coupled to a wireless speaker, and route the first audio data to a private speaker rather than the wireless speaker in response to both the first audio data having been encoded using the speech codec and the at least one processor being connected to the wireless speaker.

19. The at least one processor of claim 18, wherein to route the first audio data is to automatically route the first audio data to the private speaker.

20. The at least one processor of claim 18, wherein the at least one processor is further configured to automatically route the first audio data to the wireless speaker connected to the at least one processor rather than the private speaker in response to both the at least one processor being connected to the wireless speaker and the first audio data having been encoded using a codec other than a speech codec.

* * * * *